United States Patent
Inoue

(10) Patent No.: US 10,530,985 B2
(45) Date of Patent: Jan. 7, 2020

(54) IMAGE CAPTURING APPARATUS, IMAGE CAPTURING SYSTEM, METHOD OF CONTROLLING IMAGE CAPTURING APPARATUS, AND NON-TRANSITORY COMPUTER-READABLE STORAGE MEDIUM

(71) Applicant: CANON KABUSHIKI KAISHA, Tokyo (JP)

(72) Inventor: Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 15/911,828

(22) Filed: Mar. 5, 2018

(65) Prior Publication Data
US 2018/0255229 A1     Sep. 6, 2018

(30) Foreign Application Priority Data
Mar. 6, 2017   (JP) ................. 2017-041242

(51) Int. Cl.
*H04N 5/232*     (2006.01)
*G02B 13/02*     (2006.01)

(52) U.S. Cl.
CPC ......... *H04N 5/23212* (2013.01); *G02B 13/02* (2013.01); *H04N 5/23238* (2013.01)

(58) Field of Classification Search
CPC ............... H04N 5/23212; H04N 5/232; H04N 5/232945; H04N 5/232123; H04N 5/232933; H04N 5/23216; H04N 5/23238; G02B 13/02; G02B 27/28; G02B 27/285; G03B 13/20; G03B 19/22; G03B 35/08

USPC .......................................................... 348/345
See application file for complete search history.

(56) References Cited

U.S. PATENT DOCUMENTS

| | | | |
|---|---|---|---|
| 7,209,175 B1* | 4/2007 | Kurokawa | G03B 13/36 348/345 |
| 8,648,961 B2* | 2/2014 | Morihisa | G02B 7/30 348/349 |
| 8,780,200 B2* | 7/2014 | Yamamoto | H04N 5/23293 348/143 |
| 9,118,907 B2* | 8/2015 | Yamagata | H04N 5/23212 |
| 10,148,870 B2* | 12/2018 | Inoue | H04N 5/23229 |
| 2003/0020814 A1* | 1/2003 | Ono | H04N 5/225 348/220.1 |
| 2003/0026608 A1* | 2/2003 | Malloy Desormeaux | H04N 1/6011 396/281 |
| 2010/0097444 A1* | 4/2010 | Lablans | G03B 35/00 348/46 |

(Continued)

FOREIGN PATENT DOCUMENTS

| | | |
|---|---|---|
| JP | H08194153 A | 7/1996 |
| JP | H0943682 A | 2/1997 |

(Continued)

*Primary Examiner* — Pritham D Prabhakher
(74) *Attorney, Agent, or Firm* — Rossi, Kimms & McDowell LLP

(57) ABSTRACT

An image capturing apparatus (1) includes a focus detector (21) that performs focus detection based on a plurality of parallax image signals obtained via a second image capturer (110) with an angle of field that is wider than an angle of field of a first image capturer (100), and a controller (30, 41) that performs focus control of the first image capturer (100) based on an output signal from the focus detector (21).

19 Claims, 7 Drawing Sheets

(56) References Cited

U.S. PATENT DOCUMENTS

| | | | | |
|---|---|---|---|---|
| 2011/0062780 A1* | 3/2011 | Verges | .................. | H02J 13/001 |
| | | | | 307/38 |
| 2012/0019708 A1* | 1/2012 | Morihisa | .................. | G02B 7/30 |
| | | | | 348/348 |
| 2012/0050587 A1* | 3/2012 | Yamamoto | ........... | H04N 5/2258 |
| | | | | 348/262 |
| 2013/0120644 A1* | 5/2013 | Fujii | ........................ | G02B 7/36 |
| | | | | 348/349 |
| 2016/0110844 A1* | 4/2016 | Humfeld | ............ | H04N 5/23232 |
| | | | | 348/239 |
| 2016/0360121 A1* | 12/2016 | Cheng | .................. | H04N 13/296 |
| 2017/0034436 A1* | 2/2017 | Inoue | ..................... | H04N 5/247 |
| 2018/0184010 A1* | 6/2018 | Cohen | .................. | H04N 5/2258 |

FOREIGN PATENT DOCUMENTS

| | | | |
|---|---|---|---|
| JP | 2012003098 A | | 1/2012 |
| JP | 2012049651 A | | 3/2012 |
| JP | 2013042379 A | | 2/2013 |
| JP | 2013081159 A | | 5/2013 |

* cited by examiner

IMAGE CAPTURING APPARATUS, IMAGE CAPTURING SYSTEM, METHOD OF CONTROLLING IMAGE CAPTURING APPARATUS, AND NON-TRANSITORY COMPUTER-READABLE STORAGE MEDIUM

BACKGROUND OF THE INVENTION

Field of the Invention

The present invention relates to an image capturing apparatus including a plurality of image capturer.

Description of the Related Art

Conventionally, an autofocus using a contrast AF method is known in which a digital camera calculates a contrast of an image while changing a focus position to obtain the focus position where the contrast is maximized as an in-focus position. The autofocus using the contrast AF method has high focusing accuracy, but its processing speed is slow.

Japanese Patent Laid-open No. 2013-42379 discloses an image capturing apparatus that is provided with a unit for acquiring an object distance separately from an image capturing optical system for acquiring an image to focus an imaging lens based on distance information output from the unit in order to increase the speed of autofocusing. Japanese Patent Laid-open No. 2012-49651 discloses a method of widening a field of view of a live-view image (monitor image) compared to an imaging field of view of a telephoto lens to follow a moving object from outside the imaging field of view in order to easily capture an image of the moving object.

When an object such as a moving object is being captured using the telephoto lens, since the imaging field of view is narrow, it is difficult to grasp (find) the object again within the imaging field of view if the object is out of the imaging field of view. Even if the object can be captured within the imaging field of view, it is difficult to complete focus adjustment of the telephoto lens at that moment. That is, when an object is to be captured using the telephoto lens, it is difficult to capture the object within the imaging field of view and focus on the object at high speed.

The image capturing apparatus disclosed in Japanese Patent Laid-open No. 2013-42379 is intended to realize high speed autofocusing by providing the unit for acquiring the object distance. However, the distance information used for the autofocusing is acquired only within a range of a field of view (imaging field of view) of a main optical system. In the case of the telephoto lens, in general, an amount of movement of a focus lens with respect to a variation of the object distance increases. Therefore, even if the autofocusing starts after the object enters the field of view of the main optical system, it takes some time to focus on the object. As a result, there is a high possibility that the object is out of the imaging field of view again during the autofocusing.

Japanese Patent Laid-open No. 2012-49651 improves the followability to the moving object by widening the field of view of the monitor image compared to the imaging field of view of the telephoto lens, but it does not describe the autofocusing that is important in photographing with the telephoto lens. When the autofocusing is not completed at that moment even if the object can be caught appropriately in the imaging field of view, a blurred image is acquired and it cannot be said that the moving object with the telephoto lens was successfully photographed.

SUMMARY OF THE INVENTION

The present invention provides an image capturing apparatus, an image capturing system, a method of an image capturing apparatus, and a non-transitory computer-readable storage medium capable of achieving autofocus at high speed to easily capture an image of a moving object.

An image capturing apparatus as one aspect of the present invention includes a focus detector configured to perform focus detection based on a plurality of parallax image signals obtained via a second image capturer with an angle of field that is wider than an angle of field of a first image capturer, and a controller configured to perform focus control of the first image capturer based on an output signal from the focus detector.

An image capturing system as another aspect of the present invention includes a first image capturer, a second image capturer with an angle of field wider than that of the first image capturer, and the image capturing apparatus.

A method of controlling an image capturing apparatus as another aspect of the present invention includes the steps of performing focus detection based on a plurality of parallax image signals obtained via a second image capturer with an angle of field that is wider than an angle of field of a first image capturer, and performing focus control of the first image capturer based on a result of the focus detection.

A non-transitory computer-readable storage medium as another aspect of the present invention stores a program that causes a computer to execute the method of controlling the image capturing apparatus.

Further features of the present invention will become apparent from the following description of exemplary embodiments with reference to the attached drawings.

DESCRIPTION OF THE EMBODIMENTS

Exemplary embodiments of the present invention will be described below referring to the accompanied drawings.

Figure 8:
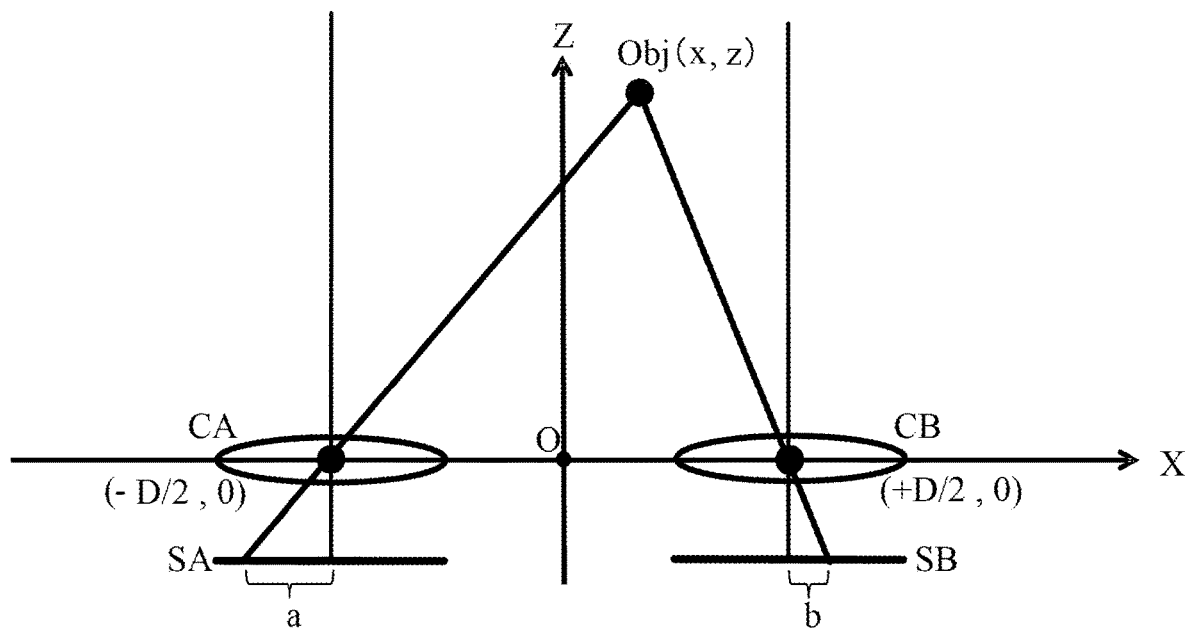
FIG. 8 is an explanatory diagram of a method of calculating an object distance in each embodiment.

First, referring to FIG. 8, a method of acquiring an object distance using two image capturing optical systems will be described. FIG. 8 is an explanatory diagram of a method of calculating the object distance, and it illustrates a situation where an image of an object Obj existing at one point in an imaging scene is captured by using two image capturing optical systems CA and CB having the same structure. Image sensors SA and SB receive object images (optical images) formed by the image capturing optical systems CA and CB, respectively. The centers of entrance pupils of the image capturing optical systems CA and CB exist at (−D/2,0) and (D/2,0), respectively, and the object Obj exists at (x,z). Assuming that a focal length of each of the image capturing optical systems CA and CB is f, and coordinates of the object Obj in the image sensors SA and SB are a and b, respectively, expression (1) below is satisfied.

$$z = \frac{fD}{b-a} \quad (1)$$

In expression (1), b-a is a positional deviation on an imaging plane when the same object is imaged from different viewpoints, that is, parallax. If the parallax b-a (parallax amount) can be acquired, by assigning the parallax b-a, the focal length f of each of the image capturing optical systems CA and CB, and a base length D to expression (1), it is possible to calculate an object distance z (i.e., a distance from the center of the entrance pupil of the image capturing optical system to the object Obj).

Figure 9:
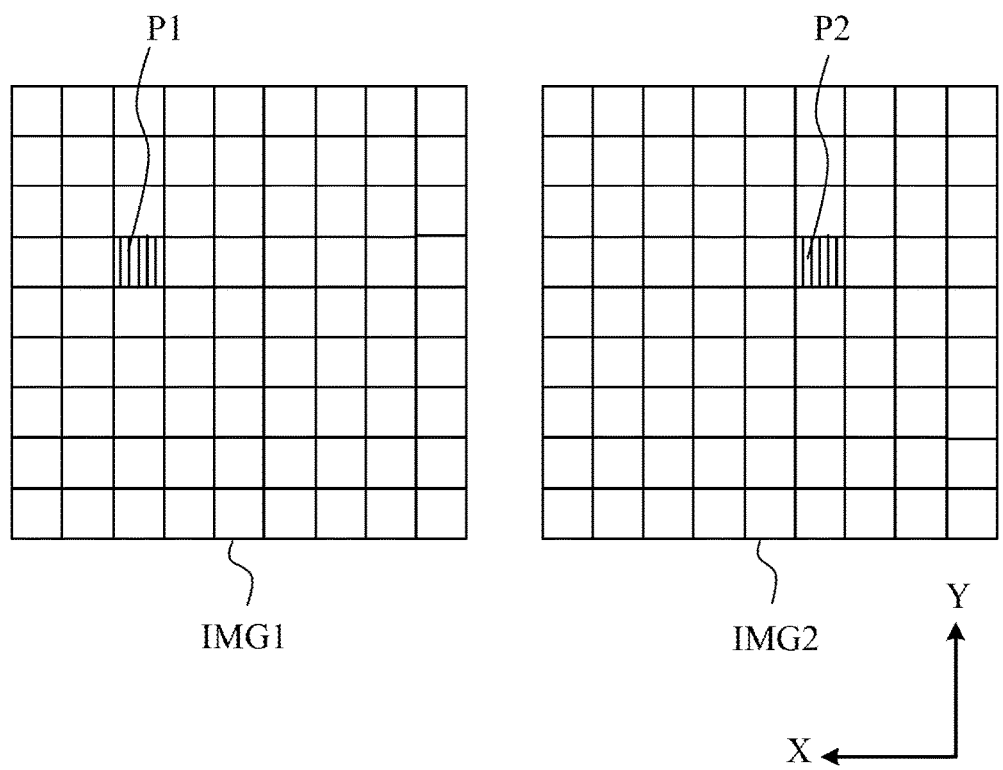
FIG. 9 is an explanatory diagram of corresponding object search processing in each embodiment.

Subsequently, referring to FIG. 9, corresponding object search processing for acquiring the parallax amount from the two images acquired by using the two image capturing optical systems will be described. FIG. 9 is an explanatory diagram of the corresponding object search processing, and it illustrates images IMG1 and IMG2 captured from different viewpoints. The image coordinate (X,Y) is defined with the center of a pixel group illustrated in FIG. 9 as the origin, the horizontal direction is the X axis, and the vertical direction is the Y axis. A pixel value of the image IMG1 located at the image coordinate (X,Y) is assumed to be F1(X,Y), and a pixel value of the image IMG2 is assumed to be F2(X,Y). A pixel of the image IMG2 corresponding to an arbitrary coordinate (X,Y) in the image IMG1 can be obtained by searching the pixel value of the image IMG2 most similar to the pixel value F1(X,Y) of the image IMG1 at the coordinate (X,Y). In the following description, a corresponding point on an image and a corresponding pixel are the same meaning.

Pixels P1 and P2 indicated by vertical lines on the images IMG1 and IMG2 illustrated in FIG. 9 correspond to corresponding pixels (corresponding points) on which light from the same object is recorded. However, it is commonly difficult to find the pixel most similar to an arbitrary pixel, and therefore similar pixels can be searched by a method, called a block matching method, by using pixels closer to the image coordinate (X,Y) as well.

For example, block matching processing when a block size is 3 will be described. Pixel values of total of three pixels of a pixel (target pixel) at an arbitrary coordinate (X,Y) in the image IMG1 and two pixels located at coordinates (X−1,Y) and (X+1,Y) next to the target pixel are F1(X,Y), F1(X−1,Y), and F1(X+1,Y), respectively. With respect to the three pixels, pixel values of pixels in the image IMG2 that are shifted by k in an X direction from the coordinate (X,Y) are F2(X+k,Y), F2(X+k−1,Y), and F2(X+k+1,Y), respectively. At this time, a similarity (degree of similarity) E between the target pixel located at the coordinate (X,Y) in the image IMG1 and the pixel located at the coordinate (X+k,Y) in the image IMG2 is defined by expression (2) below.

$$E = \quad (2)$$
$$[F1(X, Y) - F2(X+k, Y)]^2 + [F1(X-1, Y) - F2(X+k-1, Y)]^2 +$$
$$[F1(X+1, Y) - F2(X+k+1, Y)]^2 =$$
$$\sum_{j=-1}^{1} [F1(X+j, Y) - F2(X+k+j, Y)]^2$$

The similarity E is calculated while the value k is sequentially changed in expression (2), and the coordinate (X+k,Y) that gives the smallest similarity E is the coordinate of the pixel of the image IMG2 corresponding to the target pixel of the image IMG1. In this embodiment, although the similarity E is calculated while the coordinate is sequentially changed only in the X direction, the similarity E may be calculated while the coordinate is sequentially changed in a Y direction or both the X direction and the Y direction. By performing such corresponding object search processing, it is possible to acquire the coordinate of the corresponding point (corresponding pixel) in each of the two images and calculate the parallax amount that is a difference amount between them.

As described above, it is possible to calculate the parallax amount by performing the corresponding object search processing in the two images acquired by using the two image capturing optical systems and calculate the object distance based on the parallax amount. The relationship between the parallax amount and a defocus amount as an image plane movement amount is determined according to the image capturing optical system. Therefore, it is possible to calculate the defocus amount based on the parallax amount. Then, an amount of extension of a lens can be obtained based on the defocus amount to move the lens to be focused (phase difference AF).

When performing the corresponding object search processing, it is preferred that the two images to be used are focused and sharp images. In other words, it is preferred that the object is within a depth of field of the image capturing optical system when each of the two images is to be captured. This is because when the object is blurred, an incorrect point different from a true corresponding point is calculated as a corresponding point, and as a result there is a possibility that an erroneous object distance is calculated.

Subsequently, the calculation accuracy of the object distance will be described. When the object distance is s, a base length between the two image capturing optical systems is D, and the focal length of each of the two image capturing optical systems is f, an object distance resolution Δz can be represented by expression (3) below.

$$\Delta z = \frac{s}{\frac{Df}{2r(s-f)} + 1} \quad (3)$$

In Expression (3), r is the parallax resolution, and the parallax amount acquired by the corresponding object search processing includes an error of ±r at a maximum. The object distance resolution Δz is a maximum error amount when calculating the object distance, which means that the object distance including the error of ±Δz at the maximum is calculated when the distance of the object located at the distance s is acquired. In other words, the smaller the object distance resolution Δz is, the higher the calculation accuracy of the object distance is. Specifically, the calculation accuracy of the object distance increases as the object distance s is small (i.e., as the object is close), the base length D increases, the focal length f increases, or the parallax resolution r decreases.

The image capturing apparatus (image capturing system) of each embodiment includes a first image capturer (main image capturer) and a second image capturer (sub image capturer). The main image capturer includes one image capturing optical system and one image sensor, and it is a main image capturer for capturing an image. The sub image capturer includes two image capturing optical systems, and it acquires the object distance described above by using the image capturing optical systems. The image capturing apparatus focuses the main image capturer based on the object distance information acquired by using the sub image capturer. An angle of field of each of the two image capturing optical systems in the sub image capturer is larger than an angle of field of the image capturing optical system in the main image capturer, and it is possible to acquire the object distance over the entire angle of field of the main image capturer by using the sub image capturer. Therefore, the image capturing apparatus can acquire the distance of an arbitrary object within the angle of view of the main image capturer to focus the main image capturer on the object. If the object distance resolution Δz described above is smaller than the depth of field of the image capturing optical system of the main image capturer, the image capturing apparatus can focus the main image capturer with high accuracy by using the object information acquired by the sub image capturer. Thus, the outline of the focusing method performed by the image capturing apparatus of the present invention is described. Hereinafter, the image capturing apparatus (image capturing system) will be described in detail in each embodiment.

Embodiment 1

Figure 1A:
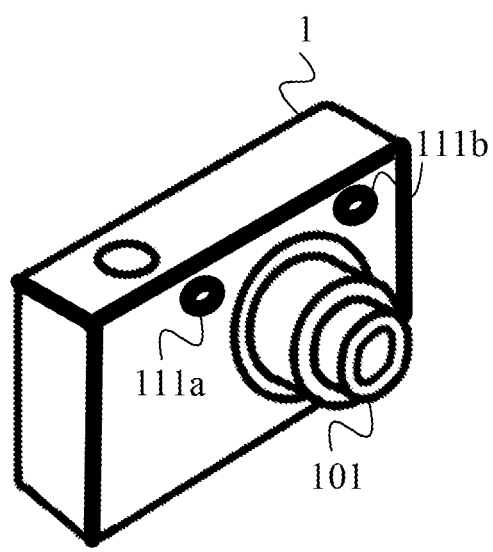
FIGS. 1A and 1B are external views of an image capturing apparatus in Embodiment 1.
Figure 1B:
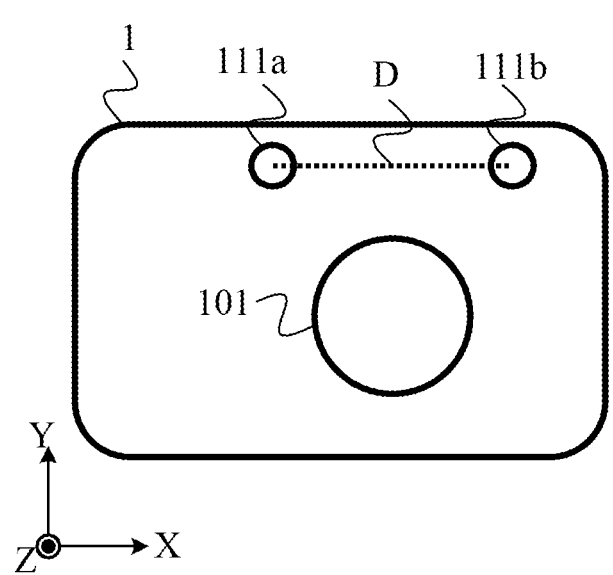
Figure 2:
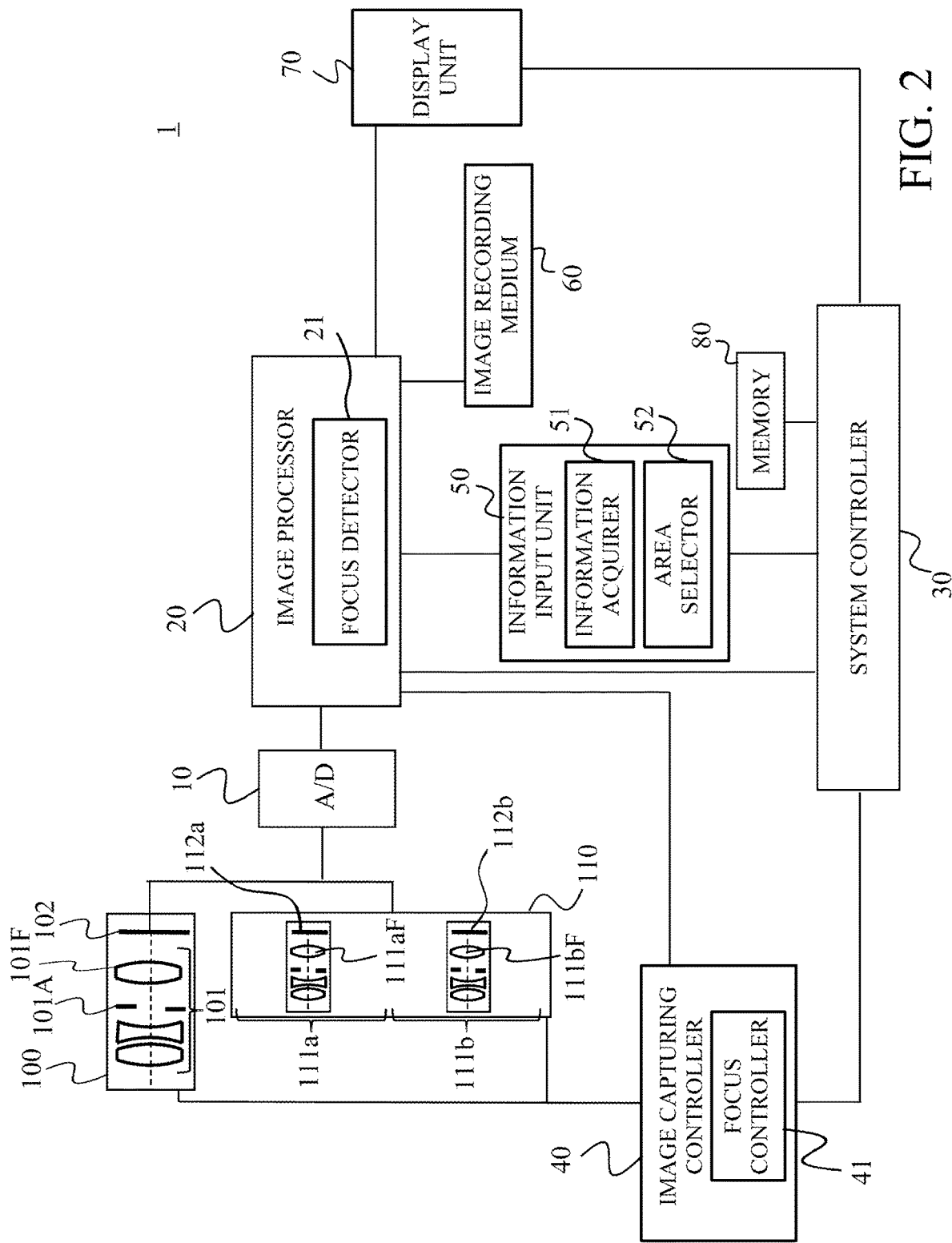
FIG. 2 is a block diagram of the image capturing apparatus in Embodiment 1.

First, referring to FIGS. 1A, 1B, and 2, an image capturing apparatus (image capturing system) 1 in Embodiment 1 of the present invention will be described. FIGS. 1A and 1B are external views of the image capturing apparatus 1, and FIGS. 1A and 1B illustrate an overhead view and a front view, respectively. FIG. 2 is a block diagram of the image capturing apparatus 1.

The image capturing apparatus 1 includes a main image capturer (first image capturer) 100 that is mainly used for capturing an image of an object and a sub image capturer (second image capturer) 110 that acquires a distance of the object. The main image capturer 100 includes an image capturing optical system (first image capturing optical system) 101 and an image sensor 102. The image capturing optical system 101 is configured to include one or more lenses, an aperture stop 101A, and a focus lens (focus mechanism) 101F, and it forms an image on the image sensor 102 based on light from an object (not illustrated). The image capturing optical system 101 is a magnification-varying optical system whose focal length changes by the drive of one or more lenses provided therein.

While the image capturing optical system 101 is configured as a part of the image capturing apparatus 1 in FIGS. 1A and 1B, it may be an interchangeable image capturing optical system such as a single-lens reflex camera. In other words, this embodiment can be applied to any of an image capturing apparatus in which an image capturing apparatus body including the image sensor 102 and the image capturing optical system 101 are integrally configured, or an image capturing apparatus in which the image capturing optical system 101 is detachable (i.e., an image capturing system including the image capturing optical system 101 and the image capturing apparatus body).

The image sensor 102 is a solid-state image sensor such as a CMOS sensor and a CCD sensor, and it photoelectrically converts an optical image (object image) formed via the image capturing optical system 101 to output an image signal (analog electric signal). Mechanical driving of the aperture stop 101A and the focus lens 101F in the image capturing optical system 101 is performed by the image capturing controller 40 (focus controller 41) based on an instruction (control) from a system controller 30. The system controller 30 and the focus controller 41 constitute a controller. An opening diameter of the aperture stop 101A is controlled according to a set aperture value (F number). The focus controller 41 controls a position of the focus lens 101F according to the object distance to perform focus adjustment. An A/D converter 10 converts an analog electric signal (image signal) output from the image sensor 102 into a digital signal.

An image processor 20 performs so-called developing processing such as pixel interpolation processing, luminance signal processing, and color signal processing on the digital signal output from the A/D converter 10 to generate an image (image data). The image generated by the image processor 20 is recorded on an image recording medium 60 such as a semiconductor memory and an optical disk. Further, the image generated by the image processor 20 may be displayed on a display unit 70. An information input unit 50 inputs various information according to an operation of a user. The information input unit 50 includes an information acquirer 51 and an area selector 52. The information acquirer 51 acquires an image capturing condition (image capturing condition information) input by the user. The image capturing condition include the F number, the ISO sensitivity of the main image capturer 100, and the like, but the present invention is not limited thereto. The area selector 52 sets (selects) a focus detection area (AF frame) of a focus detector 21 according to the operation of the user.

The sub image capturer (second image capturer) 110 includes an image capturing optical system (second image capturing optical system) 111a, an image capturing optical system (third image capturing optical system) 111b, and image sensors 112a and 112b corresponding to the image capturing optical systems 111a and 111b, respectively. Each of the image capturing optical systems 111a and 111b is a fixed focal image capturing optical system that forms an image of light from an object (not illustrated) on the image sensors 112a and 112b. Further, the image capturing optical systems 111a and 111b include focus lenses 111aF and 111bF, respectively. Analog electric signals (image signals) generated by the image sensors 112a and 112b are output to the A/D converter 10 to be converted into digital signals similarly to the case of the image sensor 102.

The image processor 20 generates two images output from the image sensors 112a and 112b, respectively. These two images correspond to object images formed by the image capturing optical systems 111a and 111b, and they are two parallax images having a parallax with each other. The image generated by the image processor 20 can be displayed on the display unit 70 similarly to the case of the main image capturer 100. While an image obtained via the image capturing optical system (second image capturing optical system) 111a is displayed on the display unit 70 in this embodiment, the present invention is not limited thereto. In this embodiment, the sub image capturer 110 may be detachable from the image capturing apparatus 1. In this case, it is possible to select a sub image capturer suitable for the main image capturer 100 of the image capturing apparatus 1 from among the plurality of sub image capturers to be attached to the image capturing apparatus 1.

The image processor 20 includes a focus detector (distance calculator) 21. The focus detector 21 calculates the object distance based on the two parallax images (i.e., two image signals output from the image sensors 112a and 112b) generated by the sub image capturer 110. The focus detector 21 may calculate the distance of a specific area or a specific object specified by the user via the area selector 52. For example, the area selector 52 can select a specific object selected by the user as the focus detection area (distance calculation area) to always set the specific object (moving object) as the focus detection area. Alternatively, it is possible to calculate the distances of all objects within an overlapped area of angles of field each other among angles of field of the image capturing optical systems 111a and 111b to generate a distance map image indicating these distances as pixel values. While the image capturing apparatus 1 includes one A/D converter 10 and one image processor 20 for the main image capturer 100 and the sub image capturer 110 in this embodiment, the present invention is not limited thereto. For example, a dedicated A/D converter and a dedicated image processor (a plurality of A/D converters and a plurality of image processors) may be provided for each of the main image capturer 100 and the sub image capturer 110.

The image capturing optical systems 111a and 111b constituting the sub image capturer 110 are arranged so that a length between lenses closest to the object (i.e., lenses closest to an object side) is 50 mm, and this length corresponds to the base length D of the sub image capturer 110. The image capturing optical systems 111a and 111b have the same configuration and are arranged in parallel so as to be bilaterally symmetrical. That is, optical axes of the image capturing optical systems 111a and 111b are parallel to each other on the object side relative to the aperture (aperture stop) in each of the image capturing optical systems 111a and 111b.

The two image capturing optical systems 111a and 111b constituting the sub image capturer 110 have the same angle of field. The angle of field of each of the image capturing optical systems 111a and 111b is wider than the angle of field of the image capturing optical system 101 constituting the main image capturer 100 at a telephoto end. In this embodiment, the focal length of the image capturing optical system 101 constituting the main image capturer 100 at the telephoto end is 1000 mm in 35 mm equivalent focal length, and the focal length of the two image capturing optical systems 111a and 111b constituting the sub image capturer 110 is 400 mm in 35 mm equivalent focal length.

Figure 3:
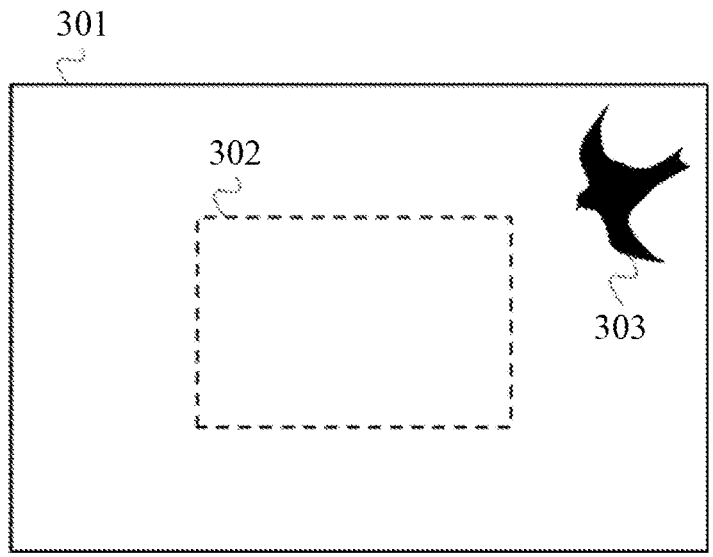
FIG. 3 is an explanatory diagram of an image displayed on a display unit in each embodiment.

Referring to FIG. 3, an image display example of the display unit 70 in the case where the image capturing optical system 101 of the main image capturer 100 is set at the telephoto end will be described. FIG. 3 is an explanatory diagram of an image displayed on the display unit 70, and it illustrates an image displayed on the display unit 70 when the image of an object (bird) 303 is to be captured.

In FIG. 3, an area surrounded by a solid line 301 is an imaging field of view (area of the imaging field of view) of the image capturing optical system 111a in the sub image capturer 110. Thus, on the display unit 70, an image being captured via the image capturing optical system 111a of the sub image capturer 110 is displayed. An area surrounded by a dashed line 302 indicates an imaging field of view (area of the imaging field of view) in the main image capturer 100. The user can confirm the imaging field of view of the main image capturer 100 by the dashed line 302 (i.e., information on the imaging field of view of the main image capturer 100) displayed on the display unit 70.

In FIG. 3, the object (bird) 303 as a target of photographing is not within a range of the imaging field of view of the main image capturer 100 (i.e., it is outside the range of the imaging field of view of the main image capturer 100), but it is within a range of the imaging field of view of the sub image capturer 110. Thus, in this embodiment, the display unit 70 displays information (dashed line 302) on the imaging field of view of the main image capturer 100 to be superimposed on the image obtained via the sub image capturer 110. Therefore, the user can easily grasp (find) the object in the imaging field of view, for example, during telephoto photography. Further, since the angle of field of the sub image capturer 110 is wider than the angle of field of the main image capturer 100 at the telephoto end, it is easy to grasp (find) the object at the time of telephoto photography using the magnification-varying optical system. Preferably, the sub image capturer 110 has an angle of field that is at least twice as wide as the angle of field of the main image capturer 100 at the telephoto end. Thus, by setting a focal length ratio (ratio of angles of field) between the main image capturer 100 and the sub image capturer 110 to be twice or more as described above, the object can be further easily captured.

In this embodiment, the display unit 70 displays the dashed line 302 for allowing the user to recognize the area of the field of view of the main image capturer 100 as the information on the imaging field of view of the main image capturer 100, but the present invention is not limited thereto. For example, the display unit 70 may display the image obtained via the main image capturer 100 to be combined with the image obtained via the sub image capturer 110 (i.e., it may display the image obtained via the main image capturer 100 to be combined in the area surrounded by the dashed line 302). By performing such a composite display, the user can easily recognize a final image captured by the main image capturer 100.

Figure 4:
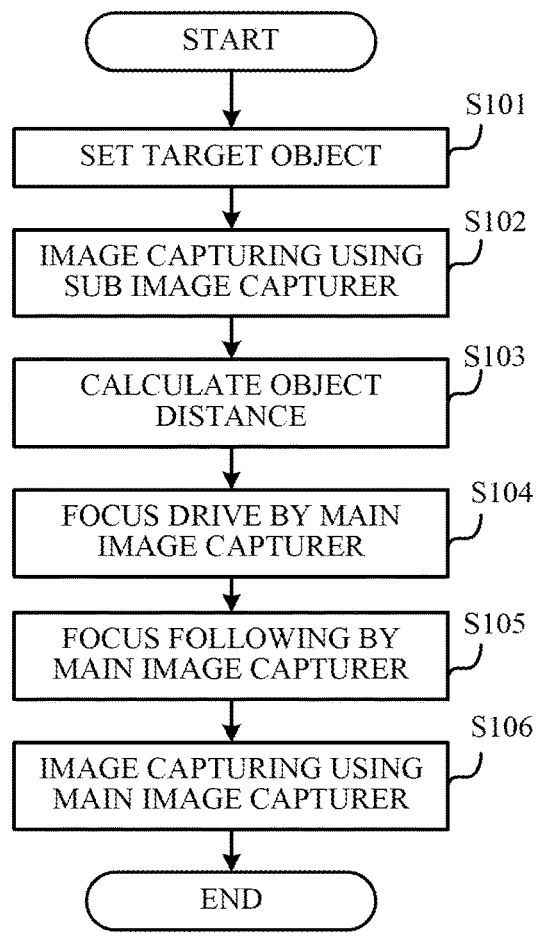
FIG. 4 is a flowchart illustrating an operation of the image capturing apparatus in Embodiment 1.
Figure 5A:
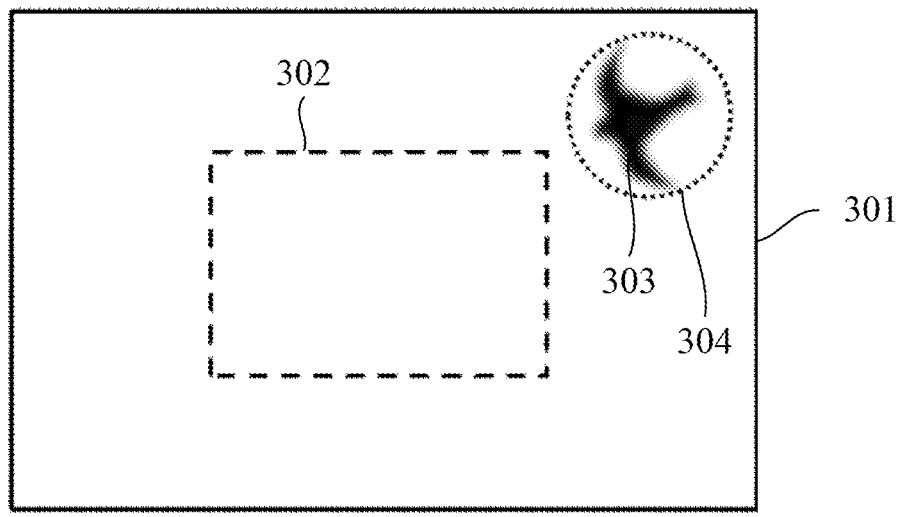
FIGS. 5A to 5C are explanatory diagrams of an image displayed on the display unit in each embodiment.
Figure 5B:
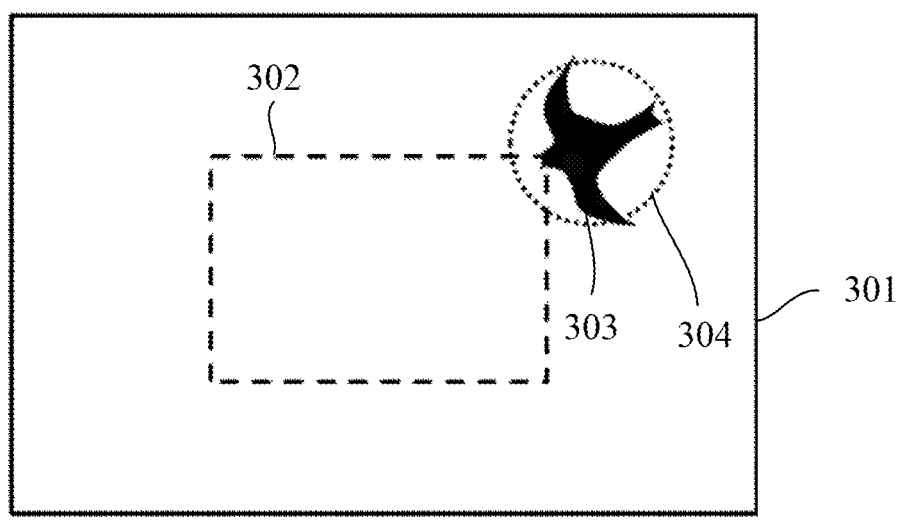
Figure 5C:
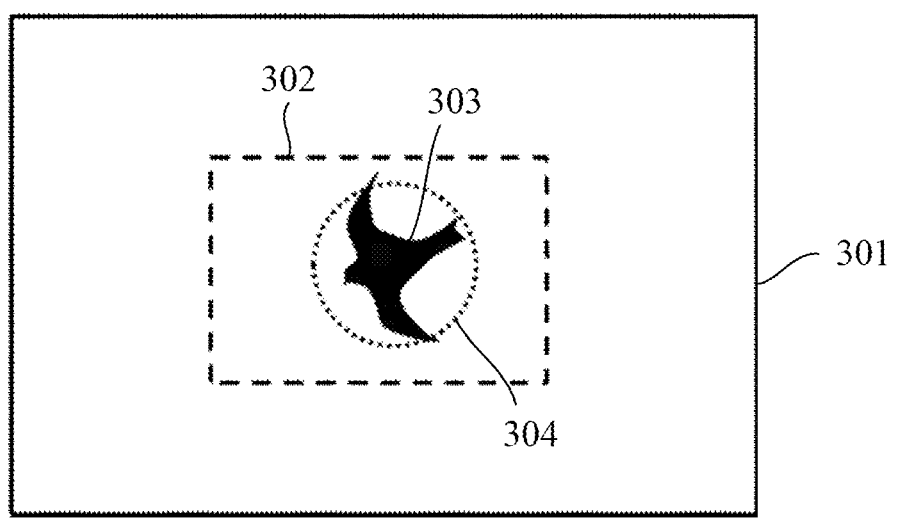

Next, referring to FIG. 4 and FIGS. 5A to 5C, an image capturing procedure of the image capturing apparatus 1 will be described. FIG. 4 is a flowchart illustrating the operation (image capturing operation) of the image capturing apparatus 1. FIGS. 5A to 5C are explanatory diagrams of images displayed on the display unit 70. Each step of FIG. 4 is mainly performed by each part of the image capturing apparatus 1 based on a command (instruction) from the system controller 30.

First, at step S101, the system controller 30 sets an object selected by the user via the area selector 52 as a target object. In this embodiment, as illustrated in FIG. 5A, when the user touches the object (bird) 303 on the image displayed on the display unit 70, an area surrounded by a circular dotted line 304 is set as the target object (focus detection area) to be displayed on the display unit 70. However, this embodiment is not limited thereto, and the system controller 30 can automatically set an object detected by a known moving object detection or an object recognition technology as the target object. Thus, in this embodiment, the display unit 70 displays information (for example, the dotted line 304) on the focus detection area of the focus detector 21 to be superimposed on the image obtained via the sub image capturer 110.

The system controller 30 acquires an image capturing condition (image capturing condition information) input by the user via the information acquirer 51. The image capturing condition includes the F number and the ISO sensitivity of the main image capturer 100 and the like, but the present invention is not limited thereto. In addition, the system controller 30 controls the aperture stop 101A and the image sensor 102 of the main image capturer 100 via the image capturing controller 40, and it sets the acquired image capturing condition.

Subsequently, at step S102, the system controller 30 controls the sub image capturer 110 via the image capturing controller 40 to perform image capturing using the sub image capturer 110, and thus it acquires two images obtained via the image capturing optical systems 111a and 111b. Subsequently, at step S103, the focus detector 21 (system controller 30) calculates the distance of the object set as the target object by using the two images acquired at step S102. Information on the focal length, the base length, a pixel size of the image sensor, and the like of the image capturing optical systems 111a and 111b, which are necessary for calculating the distance of the object, is stored in a memory 80, and the system controller 30 can receive the information from the memory 80 as appropriate. In this embodiment, as described above, the object distance is calculated by using the two-dimensional image described above, or alternatively the object distance may be calculated as a defocus amount by using a phase difference AF method.

Subsequently, at step S104, the system controller 30 drives the focus lens 101F of the main image capturer 100 via the focus controller 41. At this time, the system controller 30 focuses the image capturing optical system 101 on the target object based on the distance (object distance) of the target object calculated at step S103. In this embodiment, at the same time, the focus controller 41 drives the focus lenses 111aF and 111bF of the sub image capturer 110 to focus the sub image capturer 110 on the target object. Positions of the focus lenses 101F, 111aF, 111bF of the main image capturer 100 and the sub image capturer 110 depending on the object distance are stored as a table in the memory 80, and they can be determined as appropriate according to the image capturing information of each image capturer and the object distance.

FIG. 5B illustrates a state of step S104. The system controller 30 performs focus control of each of the main image capturer 100 and the sub image capturer 110 based on the image of the sub image capturer 110 having the angle of field wider than the angle of field of the main image capturer 100. Thus, it is possible to focus on the object before grasping (finding) the object in the imaging field of view of the main image capturer 100. Therefore, it is possible to shorten the time of focus control after the object enters the imaging field of view of the main image capturer 100, and as a result the frequency of capturing a blurred image can be reduced. When the focal distance ratio (ratio of angles of field) between the main image capturer 100 and the sub image capturer 110 is set to be twice or more as in this embodiment, it is possible to focus on the object at an earlier stage to enhance the effect. Accordingly, it is possible to improve the success rate of photographing of a moving object using a telephoto lens.

Subsequently, at step S105, the system controller 30 and the focus detector 21 repeatedly perform steps S103 and S104 to cause the in-focus position of the image capturing optical system 101 of the main image capturer 100 to follow the distance of the target object. That is, the system controller 30 and the focus detector 21 repeat the focus detection (calculation of the object distance) and the focus control, respectively, until the image capturing by the main image capturer 100 is completed. Specifically, the system controller 30 controls the position of the focus lens 101F to be minutely changed via the image capturing controller 40 to perform focus following to the object. With this operation, even when the target object moves in a depth direction, it is always possible to adjust the focus of the image capturing optical system 101 of the main image capturer 100 to the object.

Subsequently, at step S106, when the target object enters the imaging field of view of the main image capturer 100 and the user inputs an image capturing instruction, the system controller 30 controls the main image capturer 100 via the image capturing controller 40 to perform image capturing to acquire an image. The image acquired at this time is stored in the image recording medium 60, and the image capturing procedure ends. In this embodiment, in addition to the image, two images acquired by the sub image capturer 110 may be stored in the image recording medium 60, or a distance map image calculated by the image processor 20 using the two images may be stored in the image recording medium 60. FIG. 5C illustrates a state of step S106. The focus detector 21 can also output an evaluation value of the contrast AF described in the background art in accordance with the image via the main image capturer 100. Based on the evaluation value, the focus controller 41 can perform final focus control of the main image capturer 100. Even in this case, since it is the follow-up control from the in-focus state or a state substantially the same as the in-focus state, the control time only slightly increases even when the contrast AF is performed.

Embodiment 2

Figure 6:
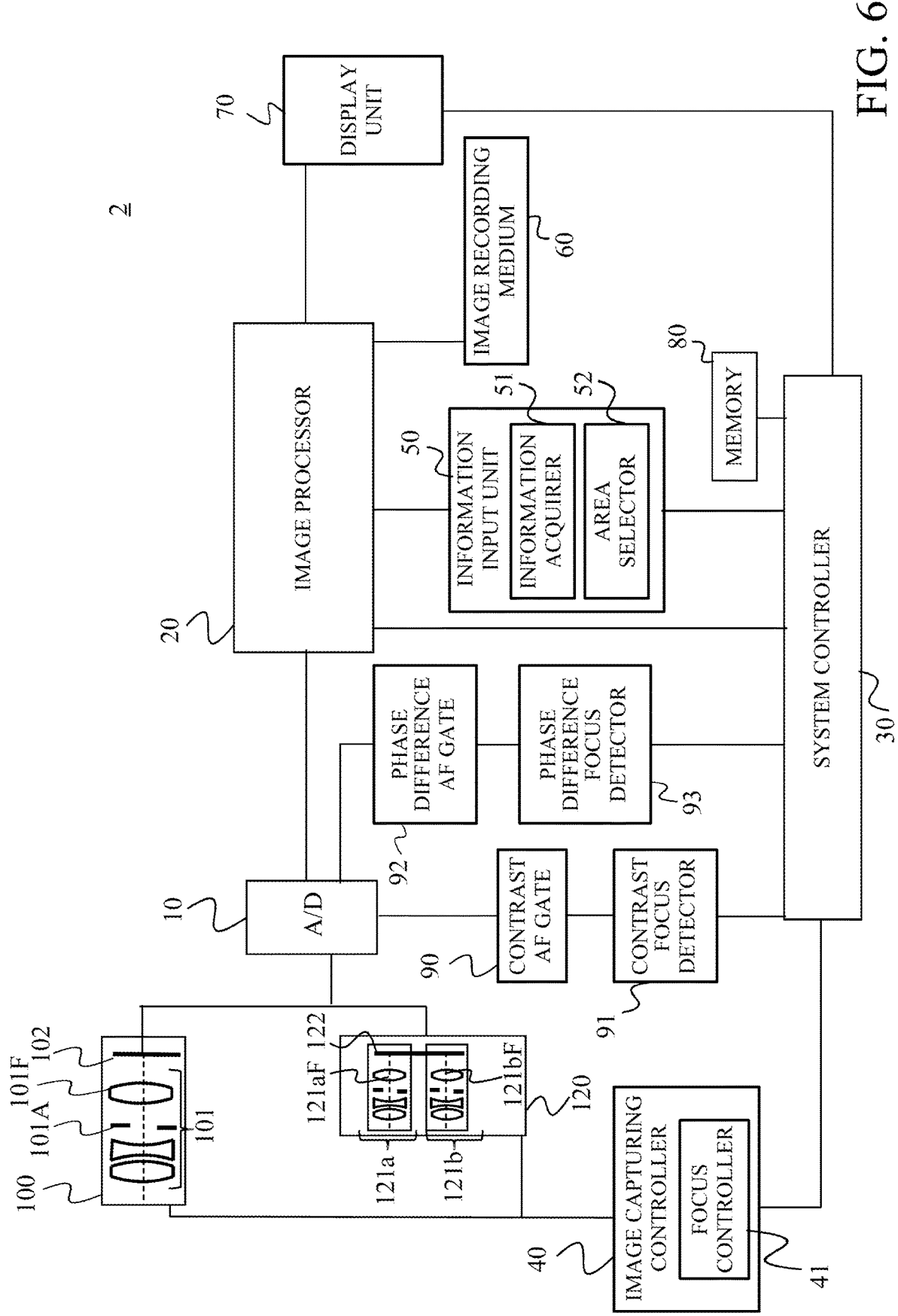
FIG. 6 is a block diagram of an image capturing apparatus in Embodiment 2.

Next, referring to FIG. 6, an image capturing apparatus (image capturing system) 2 in Embodiment 2 of the present invention will be described. FIG. 6 is a block diagram of the image capturing apparatus 2. The image capturing apparatus 2 of this embodiment is different from the image capturing apparatus 1 of Embodiment 1 in that it includes a sub image capturer 120 instead of the sub image capturer 110. Further, the image capturing apparatus 2 is different from the image capturing apparatus 1 in that it includes a contrast AF gate 90, a phase difference AF gate 92, a contrast focus detector (focus detector) 91, and a phase difference focus detector (focus detector) 93. Since other configurations of the image capturing apparatus 2 are the same as those of the image capturing apparatus 1, descriptions thereof will be omitted.

The sub image capturer (second image capturer) 120 includes image capturing optical systems 121a and 121b and an image sensor 122. Each of the image capturing optical systems 121a and 121b is a fixed focal image capturing optical system that forms an image of light from an object (not illustrated) on the image sensor 122. An analog electric signal output from the image sensor 122 is handled similarly to the analog electric signal output from the image sensor 102. The image processor 20 generates two images based on image signals (image signals obtained via the image capturing optical systems 121a and 121b) output from the image sensor 122. These two images correspond to object images formed by the image capturing optical systems 121a and 121b, and they are two parallax images having parallax with each other. In this embodiment, the sub image capturer 120 may be detachable from the image capturing apparatus 2. In this case, it is possible to select a sub image capturer suitable for the main image capturer 100 of the image capturing apparatus 2 from among a plurality of sub image capturers to be attached to the image capturing apparatus 2.

Unlike the sub image capturer 110 of Embodiment 1, the sub image capturer 120 includes only one image sensor 122 common to the two image capturing optical systems 121*a* and 121*b*. It forms images on one image sensor 122 via the two image capturing optical systems 121*a* and 121*b* to output image signals from the image sensor 122. According to this embodiment, since the number of image sensors is reduced compared to the configuration of Embodiment 1, the cost can be reduced. In this embodiment, the focal length of the image capturing optical system 101 constituting the main image capturer 100 at the telephoto end is 1000 mm in 35 mm equivalent focal length, and the focal length of the two image capturing optical systems 121*a* and 121*b* constituting the sub image capturer 120 is 400 mm in 35 mm equivalent focal length.

The A/D converter 10 converts analog electric signals (image signals) output from the image sensors 102 and 122 into digital signals to be supplied to the image processor 20 or contrast AF gate 90. The contrast AF gate 90 supplies, to the contrast focus detector 91, only a signal within a range of the focus detection area (AF frame) set by the user via the area selector 52 among all pixel output signals from the A/D converter 10. The contrast focus detector 91 applies a filter to the image signal (focus signal) supplied from the contrast AF gate 90 to extract a high frequency component to generate an AF evaluation value. The AF evaluation value is output to the system controller 30.

The phase difference AF gate 92 supplies, to the phase difference focus detector 93, only a signal of the focus detection area (AF frame) set by the user via the area selector 52 among the all pixel output signals from the A/D converter 10. The phase difference focus detector 93 performs focus detection processing by a phase difference method on the image signal (focus signal) supplied from the phase difference AF gate 92 to calculate a defocus amount. The defocus amount is output to the system controller 30.

Figure 7:
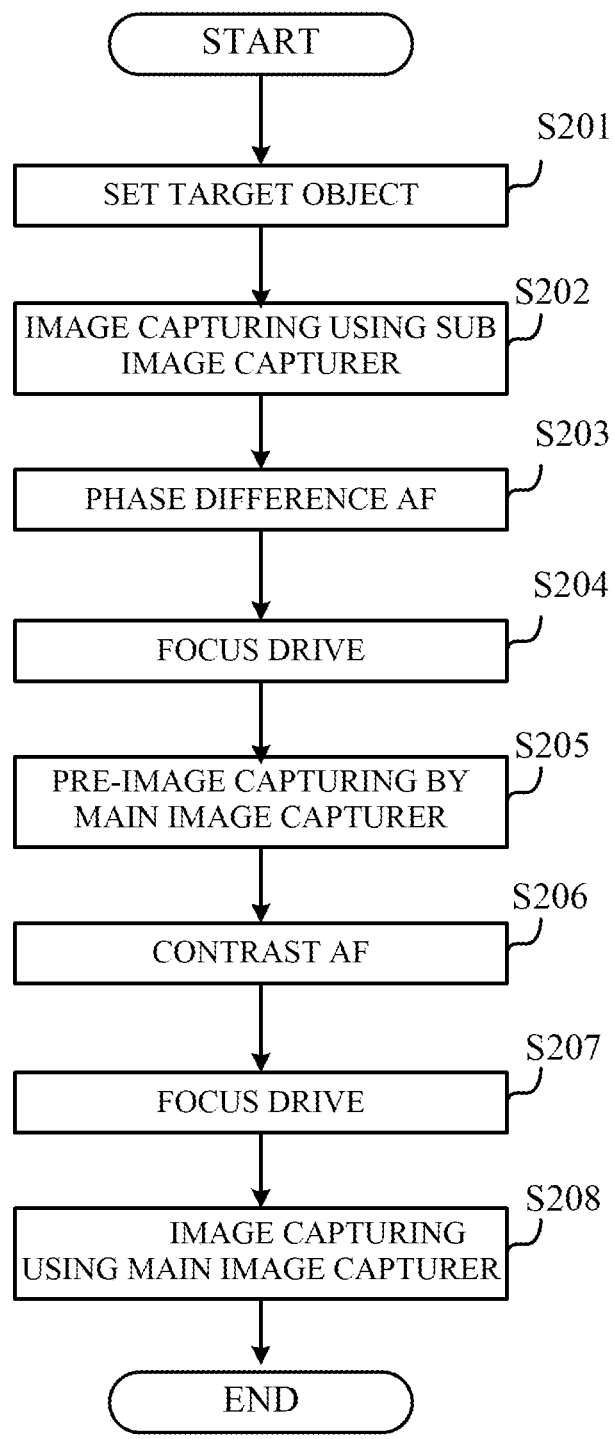
FIG. 7 is a flowchart illustrating an operation of the image capturing apparatus in Embodiment 2.

Next, referring to FIG. 7, an image capturing procedure of the image capturing apparatus 2 will be described. FIG. 7 is a flowchart illustrating the operation (image capturing operation) of the image capturing apparatus 2. Each step of FIG. 7 is mainly executed by each unit of the image capturing apparatus 2 based on a command (instruction) from the system controller 30.

First, at step S201, the system controller 30 sets the object selected by the user via the area selector 52 as a target object. In this embodiment, as illustrated in FIG. 5A, the user selects the object (bird) 303 on the image displayed on the display unit 70 by using a selection button (not illustrated), so that the area surrounded by the circular dotted line 304 is set as the target object (focus detection area) to be displayed on the display unit 70. The system controller 30 acquires the image capturing condition (image capturing condition information) input by the user via the information acquirer 51. The image capturing condition include the F number and the ISO sensitivity of the main image capturer 100, and the like, but the present invention is not limited thereto. In addition, the system controller 30 controls the aperture stop 101A and the image sensor 102 of the main image capturer 100 via the image capturing controller 40 and sets the acquired image capturing condition.

Subsequently, at step S202, the system controller 30 controls the sub image capturer 120 via the image capturing controller 40 to perform the image capturing by using the sub image capturer 120, and thus it acquires the two images obtained via the image capturing optical systems 121*a* and 121*b*.

Subsequently, at step S203, the system controller 30 calculates the defocus amount by the phase difference AF via the phase difference focus detector 93. More specifically, the system controller 30 determines the area (object) specified by the user via the area selector 52 as the focus detection area (AF frame). Then, the system controller 30 sets (controls) the phase difference AF gate 92 so that only the image signal within the determined focus detection area is supplied to the phase difference focus detector 93.

The phase difference focus detector 93 calculates the defocus amount by the corresponding object search processing described above. When a plurality of lines are used as data, for example, the corresponding object search processing can be performed for each corresponding line to obtain an average of the obtained correlation values. Further, prior to performing the corresponding object search processing, the data of a plurality of lines may be averaged in a vertical direction to create data for one line to perform the corresponding object search processing. The system controller 30 acquires the defocus amount calculated by the phase difference focus detector 93 based on the image signal within the focus detection area.

Subsequently, at step S204, the system controller 30 controls to drive the focus lens 101F of the main image capturer 100 via the focus controller 41. The focus controller 41 focuses the image capturing optical system 101 on the target object based on the defocus amount on the target object calculated at step S203. In this embodiment, at the same time, the focus controller 41 drives the focus lenses 121*a*F and 121*b*F of the sub image capturer 120 to focus the sub image capturer 120 on the target object. The positions of the focus lenses 101F, 121*a*F, and 121*b*F of the main image capturer 100 and the sub image capturer 120 according to the defocus amount are stored as a table in the memory 80, and they can be determined as appropriate according to the image capturing condition of each image capturer and the defocus amount.

FIG. 5B illustrates a state of step S204. The system controller 30 performs focus control of each of the main image capturer 100 and the sub image capturer 120 based on the image of the sub image capturer 120 having a wider angle of field than that of the main image capturer 100. Thus, it is possible to focus on the object before grasping (finding) the object in the imaging field of view of the main image capturer 100. Therefore, it is possible to shorten the time of focus control after the object enters the imaging field of view of the main image capturer 100, and as a result the frequency of capturing a blurred image can be reduced. When the focal distance ratio (ratio of angles of field) between the main image capturer 100 and the sub image capturer 120 is set to be twice or more as in this embodiment, it is possible to focus on the object at an earlier stage to enhance the effect. Accordingly, it is possible to improve the success rate of photographing of a moving object using a telephoto lens.

Subsequently, at step S205, the system controller 30 controls the main image capturer 100 via the image capturing controller 40 to perform the image capturing to acquire a pre-image. FIG. 5C illustrates a state of step S205. As illustrated in FIG. 5C, in this state, the target object (object 303) is within the imaging field of view (i.e., area surrounded by the dashed line 302) of the main image capturer 100 and the main capturer 100 substantially focuses on the target object by the operation up to step S204 of the preceding stage. However, a slight phase shift that cannot be followed by the phase difference AF occurs. In general, the contrast AF has higher focusing accuracy than the phase difference AF, and thus it is suitable for a final focus evaluation.

Subsequently, at step S206, the system controller 30 performs the contrast AF of the main image capturer 100 via the image capturing controller 40. More specifically, the system controller 30 determines an area designated by the user via the area selector 52 as the focus detection area (AF frame). Further, the system controller 30 sets the contrast AF gate 90 so that only the image signal within the determined focus detection area is supplied to the contrast focus detector 91. Then, the system controller 30 acquires an AF evaluation value generated by the contrast focus detector 91 based on the image signal within the focus detection area. Further, the system controller 30 moves the focus lens 101F to the left and right by a minute amount and again it acquires the AF evaluation values (i.e., the AF evaluation value obtained by moving to the left and the AF evaluation value obtained by moving to the right). The system controller 30 performs the contrast AF based on the AF evaluation value obtained by the minute driving.

Subsequently, at step S207, the system controller 30 controls the focus lens 101F of the main image capturer 100 via the focus controller 41 to move the focus lens 101F to a position where the AF evaluation value is maximized. In this case, since it is the follow-up control from the in-focus state or a state substantially the same as the in-focus state, the control time only slightly increases even when the contrast AF is performed.

Subsequently, at step S208, when the user inputs an image capturing instruction, the system controller 30 controls the main image capturer 100 via the image capturing controller 40 to perform image capturing to acquire an image. The image acquired at this time is stored in the image recording medium 60, and the image capturing procedure ends. In this embodiment, in addition to the image acquired by using the main image capturer 100, two images acquired by the sub image capturer 120 may be stored in the image recording medium 60. A distance map image calculated by the image processor 20 using the two images acquired via the sub image capturer 120 can be stored in the image recording medium 60.

As described above, the image capturing apparatus of each embodiment uses the sub image capturer including the two image capturing optical systems each having a wider angle of field than that of the main image capturer at the telephoto end, so that autofocusing (focus control) can be performed on the object before the object (moving object) is found in the imaging field of view. As a result, it is possible to improve the success rate of photographing of the moving object using the telephoto lens.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In each embodiment, the sub image capturer (second image capturer) includes a plurality of image capturing optical systems (a stereo optical system), but the present invention is not limited thereto. For example, the sub image capturer includes one image capturing optical system (only the second image capturing optical system), and an image sensor including a first photoelectric converter and a second photoelectric converter that receive light passing through different pupil regions of the image capturing optical system from each other. The image sensor having such a function can be realized by, for example, including the first photoelectric converter and the second photoelectric converter for one microlens and arranging microlenses in two dimensions.

This application claims the benefit of Japanese Patent Application No. 2017-041242, filed on Mar. 6, 2017, which is hereby incorporated by reference herein in its entirety.

What is claimed is:
1. An image capturing apparatus comprising:
a focus detector configured to perform focus detection based on a plurality of parallax image signals obtained via a second image capturer with an angle of field that is wider than an angle of field of a first image capturer; and
a controller configured to perform focus control of the first image capturer based on an output signal from the focus detector,
wherein the focus detector is configured to calculate an object distance or a defocus amount based on the plurality of parallax image signals obtained via the second image capturer, and
wherein the controller is configured to perform the focus control of the first image capturer based on the output signal relating to the object distance or the defocus amount.

2. The image capturing apparatus according to claim 1, wherein when a focus detection area of the focus detector is outside a range of an imaging field of view of the first image capturer, the controller is configured to perform the focus control of the first image capturer based on the plurality of parallax image signals obtained via the second image capturer.

3. The image capturing apparatus according to claim 2, further comprising an area selector configured to select the focus detection area,
wherein when the focus detection area is set outside the range of the imaging field of view of the first image capturer and within an imaging field of view of the second image capturer by the area selector, the controller is configured to perform the focus control of the first image capturer based on the plurality of parallax image signals obtained via the second image capturer.

4. The image capturing apparatus according to claim 1, further comprising a display unit configured to display an image obtained via the second image capturer.

5. The image capturing apparatus according to claim 4, wherein the display unit is configured to display information relating to an imaging field of view of the first image capturer to be superimposed on the image obtained via the second image capturer.

6. The image capturing apparatus according to claim 4, wherein the display unit is configured to display an image obtained via the first image capturer to be combined with the image obtained via the second image capturer.

7. The image capturing apparatus according to claim 4, wherein the display unit is configured to display information relating to a focus detection area of the focus detector to be superimposed on the image obtained via the second image capturer.

8. The image capturing apparatus according to claim 1, wherein the controller is configured to perform focus control of the second image capturer, along with the focus control of the first image capturer, based on the output signal from the focus detector.

9. The image capturing apparatus according to claim 1, wherein the focus detector and the controller are configured to repeat the focus detection and the focus control, respectively, until image capturing by the first image capturer is completed.

10. An image capturing system comprising:
a first image capturer;
a second image capturer with an angle of field wider than that of the first image capturer; and
the image capturing apparatus according to claim 1.

11. The image capturing system according to claim 10, wherein the first image capturer includes:
a first image capturing optical system including a first focus lens unit, and
an image sensor configured to photoelectrically convert an optical image formed via the first image capturing optical system.

12. The image capturing system according to claim 11,
wherein the first image capturing optical system is a magnification-varying optical system, and
wherein the second image capturer has an angle of field that is wider than an angle of field of the first image capturer at a telephoto end.

13. The image capturing system according to claim 12, wherein the second image capturer has the angle of field that is at least twice as wide as the angle of field of the first image capturer at the telephoto end.

14. The image capturing system according to claim 10, wherein the second image capturer includes a second image capturing optical system including a second focus lens unit.

15. The image capturing system according to claim 14, wherein the second image capturer includes an image sensor configured to receive light passing through different pupil regions of the second image capturing optical system from each other.

16. The image capturing system according to claim 14,
wherein the second image capturer includes a third image capturing optical system including a third focus lens unit, and
wherein at an object side relative to each of apertures of the second and the third image capturing optical systems, optical axes of the second and the third image capturing optical systems are parallel to each other.

17. The image capturing optical system according to claim 16, wherein each of the second and the third image capturing optical systems is a fixed focal image capturing optical system.

18. A method of controlling an image capturing apparatus comprising the steps of:
performing focus detection based on a plurality of parallax image signals obtained via a second image capturer with an angle of field that is wider than an angle of field of a first image capturer; and
performing focus control of the first image capturer based on a result of the focus detection,
calculating an object distance or a defocus amount based on the plurality of parallax image signals obtained via the second image capturer, and
performing the focus control of the first image capturer based on the output signal relating to the object distance or the defocus amount.

19. A non-transitory computer-readable storage medium storing a program that causes a computer to execute a process comprising the steps of:
performing focus detection based on a plurality of parallax image signals obtained via a second image capturer with an angle of field that is wider than an angle of field of a first image capturer; and
performing focus control of the first image capturer based on a result of the focus detection,
calculating an object distance or a defocus amount based on the plurality of parallax image signals obtained via the second image capturer, and
performing the focus control of the first image capturer based on the output signal relating to the object distance or the defocus amount.

* * * * *